(12) United States Patent
Kim (10) Patent No.: US 9,906,587 B2
(45) Date of Patent: *Feb. 27, 2018

(54) DATA TRANSMISSION IN CLOUD-BASED SYSTEM

(71) Applicant: Empire Technology Development LLC, Wilmington, DE (US)

(72) Inventor: Seungil Kim, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,724

(22) Filed: May 11, 2015

(65) Prior Publication Data

US 2015/0244785 A1 Aug. 27, 2015

Related U.S. Application Data

(63) Continuation of application No. 13/576,265, filed as application No. PCT/US2012/024654 on Feb. 10, 2012, now Pat. No. 9,083,638.

(51) Int. Cl.
*H04L 29/08* (2006.01)
*G06F 21/44* (2013.01)
(Continued)

(52) U.S. Cl.
CPC ............ *H04L 67/10* (2013.01); *A63F 13/355* (2014.09); *G06F 17/30598* (2013.01);
(Continued)

(58) Field of Classification Search
CPC ........ H04L 67/10; H04L 43/16; H04L 47/25; H04L 47/14; H04L 47/2441; H04W 84/18;
(Continued)

(56) References Cited

U.S. PATENT DOCUMENTS

| 4,807,222 A | 2/1989 | Amitay |
| 6,185,646 B1 * | 2/2001 | Barrett ................ G06F 13/1663 710/107 |

(Continued)

FOREIGN PATENT DOCUMENTS

| JP | 2005095601 A | 4/2005 |
| JP | 2008049169 A | 3/2008 |

(Continued)

OTHER PUBLICATIONS

International Search Report and Written Opinion from International Application No. PCT/US12/24654 mailed May 23, 2012.

(Continued)

*Primary Examiner* — Brian J Gillis
*Assistant Examiner* — Amy Ling
(74) *Attorney, Agent, or Firm* — Brundidge & Stanger, P.C.

(57) ABSTRACT

Technologies are generally described for a data transmission scheme for a cloud-based system. In some examples, a data transmission system may include a communication speed determination unit configured to determine communication speed between a server and multiple client devices connected to the server; a client classification unit configured to classify each of the multiple client devices based at least in part on the communication speed determined by the communication speed determination unit; and a data transmission unit configured to transmit a predetermined portion of data to one or more of the client devices connected to the server.

19 Claims, 5 Drawing Sheets

(51) Int. Cl.
*G06F 17/30* (2006.01)
*H04L 12/26* (2006.01)
*A63F 13/355* (2014.01)
*H04L 12/825* (2013.01)
*H04W 84/18* (2009.01)
*H04L 12/801* (2013.01)
*H04L 12/851* (2013.01)

(52) U.S. Cl.
CPC ............ *G06F 21/445* (2013.01); *H04L 43/16* (2013.01); *H04L 47/25* (2013.01); *H04L 47/14* (2013.01); *H04L 47/2441* (2013.01); *H04W 84/18* (2013.01)

(58) Field of Classification Search
CPC . A63F 13/355; G06F 17/30598; G06F 21/445
See application file for complete search history.

(56) References Cited

U.S. PATENT DOCUMENTS

| | | | |
|---|---|---|---|
| 9,083,638 | B2 | 7/2015 | Kim |
| 2003/0172136 | A1 | 9/2003 | Katagawa et al. |
| 2003/0228892 | A1 | 12/2003 | Maalismaa et al. |
| 2004/0015536 | A1 | 1/2004 | Cohen et al. |
| 2005/0256926 | A1 | 11/2005 | Muhonen et al. |
| 2005/0261058 | A1* | 11/2005 | Nguyen ................ G07F 17/32 463/40 |
| 2007/0143357 | A1 | 6/2007 | Chaudhri |
| 2007/0147375 | A1 | 6/2007 | Lee et al. |
| 2007/0297341 | A1 | 12/2007 | Chiu et al. |
| 2008/0102947 | A1 | 5/2008 | Hays et al. |
| 2009/0118020 | A1* | 5/2009 | Koivisto ................ A63F 13/12 463/42 |
| 2011/0166628 | A1 | 7/2011 | Jain |
| 2011/0287828 | A1 | 11/2011 | Anderson et al. |
| 2012/0246244 | A1* | 9/2012 | Mallet .................... G06Q 50/01 709/206 |
| 2012/0271913 | A1 | 10/2012 | Tallgren et al. |
| 2013/0066951 | A1 | 3/2013 | Agranat et al. |

FOREIGN PATENT DOCUMENTS

| | | |
|---|---|---|
| JP | 2010529547 A | 8/2010 |
| JP | 2011151701 A | 8/2011 |
| KR | 1020070011610 A | 1/2007 |
| KR | 1020070067005 A | 6/2007 |

OTHER PUBLICATIONS

K. Karlsson, et al., "Ad HOC Networks: Overview, applications and routing issues".

Lee, et al. "A Comparative Study of Wireless Protocols: Bluetooth, UWB, ZigBee, and Wi-Fi", the 33rd Annual Conference of the IEEE Industrial Electronic Society (IECON), Nov. 5-8, 2007.

"802.11—IEEE Standard for Information Technology—Telecommunications and information exchange between systems—Local and metropolitan area networks—Specific requirements; Part II: Wireless LAN MAC and PHY Specifications", Mar. 8, 2007, IEEE Computer Society, IEEE Std 802.11-2007 (Revision of IEEE Std 802.11-1999), 1076 Pages.

"802.15.1: IEEE Standard for Information technology—Telecommunications and information exchange between systems—Local and metropolitan area networks—Specific requirements; Part 15.1: Wireless medium access control (MAC) and physical layer (PHY) specifications for wireless personal area networks (WPANs)"; Jun. 14, 2005, IEEE Computer Society, IEEE.

"802.15.4: IEEE Standard for Local and metropolitan area networks—Part 15.4: Low-Rate Wireless Personal Area Networks (LR WPANs)"; Sep. 5, 2011, IEEE Computer Society, IEEE Std 802. 15.4-2011 (Revision of IEEE Std 802.15.4-2006), p. 194-221, 314 Pages.

* cited by examiner

DATA TRANSMISSION IN CLOUD-BASED SYSTEM

CROSS-REFERENCE TO RELATED APPLICATIONS

This Application is a Continuation Application under 35 U.S.C. § 120 of U.S. application Ser. No. 13/576,265, filed on Jul. 31, 2012, now U.S. Pat. No. 9,083,638, which is a U.S. National Stage filing under 35 U.S.C. § 371 of International Application No. PCT/US12/24654, filed on Feb. 10, 2012. The disclosures of both U.S. application Ser. No. 13/576,265 and International Application No. PCT/US12/24654 are hereby incorporated herein by reference in their entireties.

BACKGROUND

High-end mobile electronic devices such as smartphones and tablets provide ubiquitous network connectivity to the users thereof. For example, a group of users may connect their devices to a game server, and play an online game together anywhere they want. However, when the connection quality is unstable and/or the communication speeds between the devices and the server are slow, the users have to bear with the inconvenience of the discontinuity of the game. Further, as the number of devices connected to the server increases, the amount of data traffic to be transmitted from the server correspondingly increases, which results in a heavy load on the network.

SUMMARY

In an example, a data transmission system may include a communication speed determination unit configured to determine communication speeds between a server and multiple client devices connected to the server, a client classification unit configured to classify each of the multiple client devices based at least in part on the communication speeds determined by the communication speed determination unit, and a data transmission unit configured to transmit a predetermined portion of data to one or more of the client devices connected to the server.

In another example, a method performed under control of a server may include receiving a request for data from multiple client devices that are connected to the server and are running a same application program, classifying the multiple client devices into at least a first group and a second group based at least in part on respective communication speeds of the multiple client devices, the first group and the second group respectively including one or more client devices among the multiple client devices, and transmitting to the one or more client devices classified into the first group at least some of common data to be used in common for the same application program run by the multiple client devices.

In yet another example, a computer-readable storage medium may store computer-executable instructions that, in response to execution, cause a data transmission system to perform operations, including classifying multiple client devices connected to a server into at least a first group and a second group based at least in part on respective communication speeds of the multiple client devices, transmitting to one or more client devices classified into the first group at least some of common data to be used in common by the multiple client devices, and instructing the one or more client devices classified into the first group to deliver the at least some of the common data to at least some of one or more client devices classified into the second group.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a data transmission scheme for a cloud-based system.

Technologies are generally described for a cloud-based system in which a cloud server provides a cloud service to end users over a network. In some examples, the cloud server may provide the cloud service to a group of users over a mobile telecommunications network, such as, for example, a 3rd generation (3 G) mobile telecommunications network, a 4th generation (4 G) mobile telecommunications network, etc. In some examples, the group of users may gather to play an online game together, which is provided by a cloud game server.

In some examples, a data transmission system, which may be a component of the server or separate from the server but controlled by the server, may determine or measure respective communication speeds between the server and multiple client devices of the users. In some examples, the data transmission system may classify each of the client devices into either of a high-speed group or a low-speed group based at least in part on the respective communication speeds between the server and the client devices. In some examples, the data transmission system may transmit to one or more of the client devices classified into the high-speed group at least some of data to be used in common among all of the multiple client devices, i.e., common data.

In some examples, the data transmission system may determine the common data to be used for the multiple client devices connected to the server. In some examples, when the server provides an online game and the client devices connected to the server run a same game application program associated with the game, the common data includes at least one of background music, a background image, and an advertisement to be commonly used in the game application program.

In some examples, the data transmission system may transmit an instruction to the one or more of the client devices classified into the high-speed group to deliver at least some of the common data to one or more of the client devices classified into the low-speed group. In some examples, the one or more of the client devices classified into the high-speed group may deliver the at least some of the common data to one or more of the client devices classified into the low-speed group via an ad-hoc network such as, for example, a Wi-Fi network, a Bluetooth network, and an ultra-wideband (UWB) network.

Figure 1:
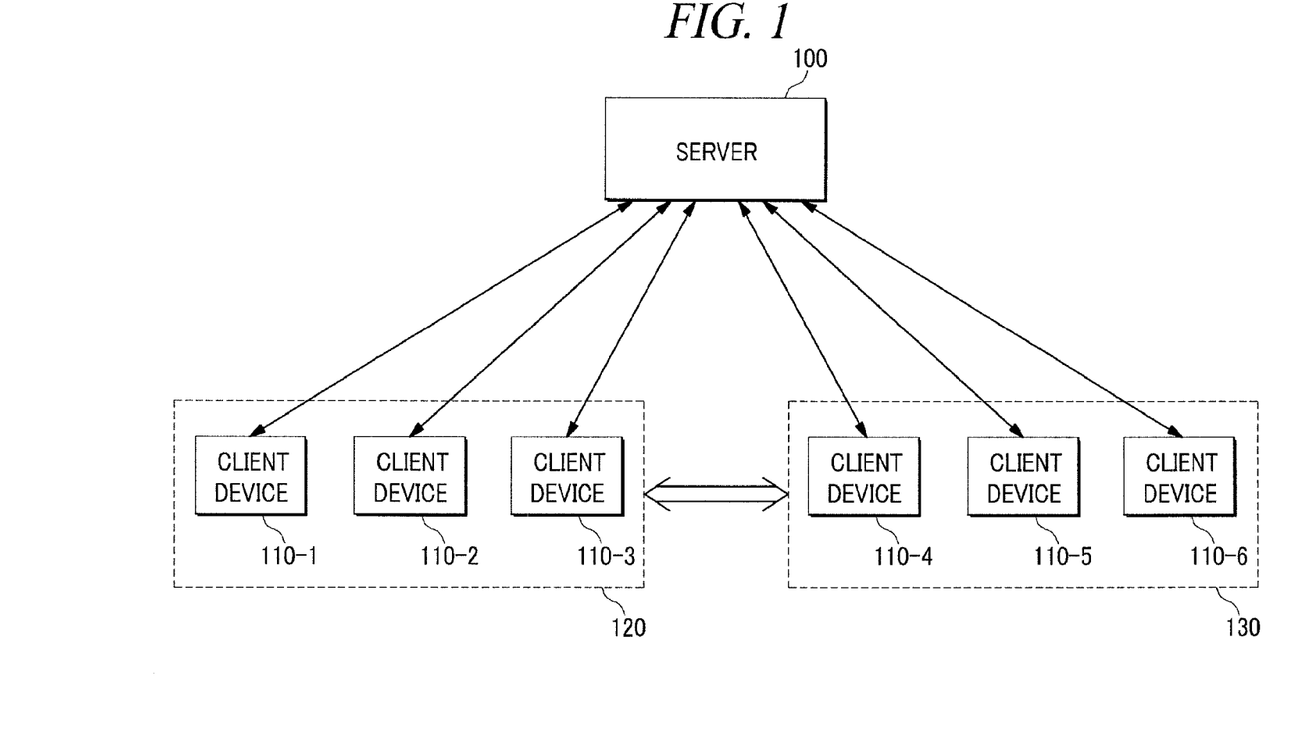
FIG. 1 schematically shows an illustrative example of an environment in which a group of client devices are connected to a server providing a cloud service over a network, arranged in accordance with at least some embodiments described herein.

FIG. 1 schematically shows an illustrative example of an environment in which a group of client devices are connected to a server providing a cloud service over a network, arranged in accordance with at least some embodiments described herein.

As depicted in FIG. 1, a server 100 may provide a cloud service to multiple client devices 110-1, 110-2, 110-3, 110-4, 110-5 and 110-6 connected to server 100. In some embodiments, server 100 may provide the cloud service to each of client devices 110-1, 110-2, 110-3, 110-4, 110-5 and 110-6 over a mobile telecommunications network. By way of example, but not limitation, the mobile telecommunications network may include a 3rd generation (3 G) mobile telecommunications network, 4th generation (4 G) mobile telecommunications network, etc. Examples of client devices 110-1, 110-2, 110-3, 110-4, 110-5 and 110-6 may include, but are not limited to, a mobile phone, a smartphone, a personal digital assistant (PDA), a tablet, a laptop computer, a desktop computer, or any other devices having communication capability, relative to other devices including, e.g., server 100 and other client devices. Although FIG. 1 illustrates that six client devices are connected to server 100, one skilled in the art will appreciate that any number of client devices can be connected to server 100.

In some embodiments, server 100 may provide each of client devices 110-1, 110-2, 110-3, 110-4, 110-5 and 110-6 with data necessary for the cloud service. By way of example, but not limitation, when users of client devices 110-1, 110-2, 110-3, 110-4, 110-5 and 110-6 play a game provided by server 100, i.e., server 100 provides a game service to client devices 110-1, 110-2, 110-3, 110-4, 110-5 and 110-6, server 100 may provide client devices 110-1, 110-2, 110-3, 110-4, 110-5 and 110-6 with game data necessary and appropriate for the respective users. By way of example, but not limitation, the game data may include numeric data, alphanumeric data, photographic or video data, sound data, and any other types of data associated with the game provided by server 100.

In some embodiments, server 100 may determine common data to be used for at least some of client devices 110-1, 110-2, 110-3, 110-4, 110-5 and 110-6, and transmit the common data to some of client devices 110-1, 110-2, 110-3, 110-4, 110-5 and 110-6, thereby reducing the overall amount of data transmitted from server 100. By way of example, but not limitation, when server 100 provides the game service to client devices 110-1, 110-2, 110-3, 110-4, 110-5 and 110-6, the common data may include at least one of background music, a background image, and an advertisement to be commonly used for the at least some of client devices 110-1, 110-2, 110-3, 110-4, 110-5 and 110-6.

In some embodiments, server 100 may determine a communication speed between server 100 and each of client devices 110-1, 110-2, 110-3, 110-4, 110-5 and 110-6. In some embodiments, server 100 may measure the actual communication speeds between server 100 and client devices 110-1, 110-2, 110-3, 110-4, 110-5 and 110-6. In some embodiments, server 100 may estimate the communication speeds based at least in part on the type of network between server 100 and client devices 110-1, 110-2, 110-3, 110-4, 110-5 and 110-6. By way of example, but not limitation, when one of client devices 110-1, 110-2, 110-3, 110-4, 110-5 and 110-6 is connected to server 100 via a 3rd generation (3G) mobile telecommunications network, server 100 may estimate the communication speed between server 100 and the corresponding client device as the average communication speed of the 3G mobile telecommunications network.

In some embodiments, server 100 may classify client devices 110-1, 110-2, 110-3, 110-4, 110-5 and 110-6 into at least a first group 120 and a second group 130 based at least in part on the respective communication speeds between server 100 and respective ones of client devices 110-1, 110-2, 110-3, 110-4, 110-5 and 110-6. In some embodiments, server 100 may classify one or more of client devices 110-1, 110-2, 110-3, 110-4, 110-5 and 110-6 with higher communication speeds as first group 120 and classify one or more of client devices 110-1, 110-2, 110-3, 110-4, 110-5 and 110-6 with lower communication speeds as second group 130. By way of example, but not limitation, when the respective communication speeds between server 100 and client devices 110-1, 110-2 and 110-3 are relatively higher than the respective communication speeds between server 100 and client devices 110-4, 110-5 and 110-6, server 100 may classify client devices 110-1, 110-2 and 110-3 as first group 120, and classify client devices 110-4, 110-5 and 110-6 as second group 130, as illustrated in FIG. 1. Although FIG. 1 illustrates that three client devices are classified into first group 120 while three devices are classified into second group 130, one skilled in the art will appreciate that a ratio between a quantity of client devices classified into first group 120 and a quantity of client devices classified into second group 130 may vary based on several factors. For example, the ratio between the quantity of client devices classified into first group 120 and the quantity of client devices classified into second group 130 may vary depending on the type of the cloud service provided by server 100 and/or an application program run by the client devices.

In some embodiments, server 100 may transmit to client devices 110-1, 110-2 and 110-3 classified into first group 120 at least some of the common data, and instruct client devices 110-1, 110-2 and 110-3 classified into first group 120 to deliver at least some of the transmitted common data to client devices 110-4, 110-5 and 110-6 classified into second group 130. In some embodiments, server 100 may instruct client devices 110-1, 110-2 and 110-3 to deliver at least some of the transmitted common data to client devices 110-4, 110-5 and 110-6 via an ad-hoc network. By way of example, but not limitation, the ad-hoc network may include a Wi-Fi network, a Bluetooth network, and an ultra-wideband (UWB) network. In some embodiments, server 100 may determine whether client devices 110-1, 110-2, 110-3, 110-4, 110-5 and 110-6 are located close enough to one another so that they can communicate via the ad-hoc network.

In some embodiments, before transmitting the common data, or portions thereof, to client devices 110-1, 110-2 and 110-3 classified into first group 120, server 100 may assign at least some of the common data to client devices 110-1, 110-2 and 110-3. In some embodiments, server 100 may divide the common data, assign the divided data to each of client devices 110-1, 110-2 and 110-3, and instruct client devices 110-1, 110-2 and 110-3 to share the common data with other client devices including client devices 110-4, 110-5 and 110-6. In such cases, the overall amount of data traffic from server 100 may be reduced, and thus the overall load of server 100 and/or the overall network load between server 100 and client devices 110-1, 110-2, 110-3, 110-4, 110-5 and 110-6 may be reduced. Alternatively, server 100 may select some of client devices 110-1, 110-2 and 110-3 classified into first group 120 and assign the common data to the selected ones. Alternatively, server 100 may assign the common data respectively to client devices 110-1, 110-2 and 110-3 without dividing the common data.

In some embodiments, when assigning the at least some of the common data to client devices 110-1, 110-2 and 110-3 classified into first group 120, server 100 may consider a data reception capability of each of client devices 110-1, 110-2 and 110-3, i.e., a capability to receive data from server 100, and/or a data delivery capability of each of client devices 110-1, 110-2 and 110-3, i.e., a capability to deliver data to client devices 110-4, 110-5 and 110-6. By way of example, but not limitation, the data reception capability may be associated with at least one of the download speed and the available bandwidth of the network over which server 100 may provide the cloud service to client devices 110-1, 110-2 and 110-3. By way of example, but not limitation, the data delivery capability may be associated with the communication speed of the ad-hoc network between client devices 110-1, 110-2 and 110-3 and client devices 110-4, 110-5 and 110-6.

Figure 2:
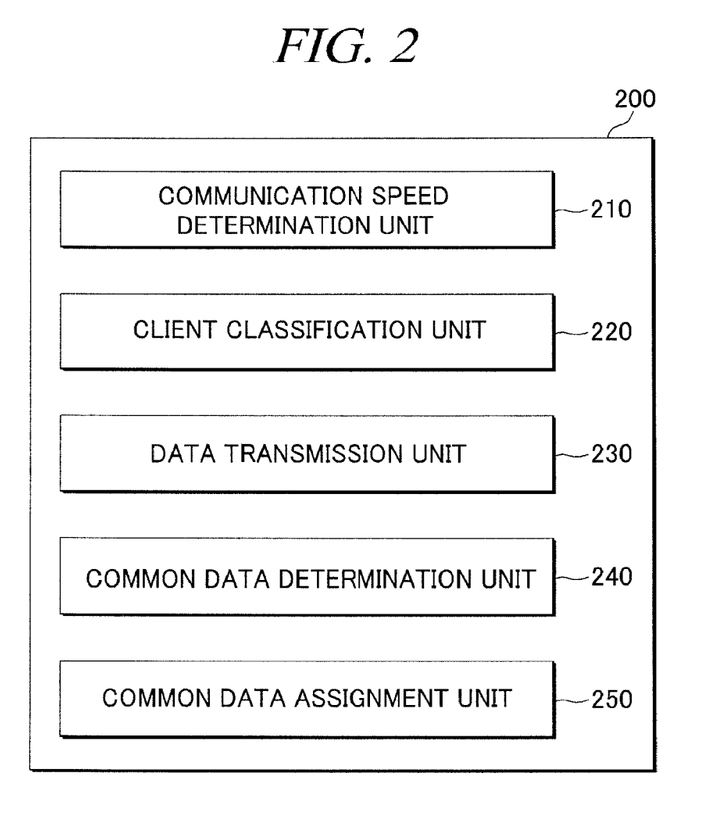
FIG. 2 shows a schematic block diagram illustrating an example architecture for providing a data transmission scheme for a cloud-based system, arranged in accordance with at least some embodiments described herein.

FIG. 2 shows a schematic block diagram illustrating an example architecture for providing a data transmission scheme for a cloud-based system, arranged in accordance with at least some embodiments described herein.

A data transmission system 200 may include a communication speed determination unit 210, a client classification unit 220, a data transmission unit 230, a common data determination unit 240 and a common data assignment unit 250. Although illustrated as discrete components, various components may be divided into additional components, combined into fewer components, or eliminated altogether while being contemplated within the scope of the disclosed subject matter.

Communication speed determination unit 210 may be configured to determine communication speeds between a server (e.g., server 100 in FIG. 1) and multiple client devices (e.g., client devices 110-1, 110-2, 110-3, 110-4, 110-5 and 110-6 in FIG. 1) connected to the server. In some embodiments, communication speed determination unit 210 may measure the actual communication speeds between the server and the client devices. In some embodiments, communication speed determination unit 210 may estimate the communication speeds based at least in part on the type of network between the server and the client devices. By way of example, but not limitation, when a client device is connected to the server via a 3rd generation (3G) mobile telecommunications network, communication speed determination unit 210 may estimate the communication speed between the server and the corresponding client device as the average communication speed of the 3G mobile telecommunications network.

Client classification unit 220 may be configured to classify each of the multiple client devices based at least in part on the communication speed determined by communication speed determination unit 210. In some embodiments, client classification unit 220 may classify each of the client devices into either of a high-speed group or a low-speed group based at least in part on the communication speed determined by communication speed determination unit 210.

Data transmission unit 230 may be configured to transmit data to one or more of the multiple client devices connected to the server. In some embodiments, data transmission unit 230 may transmit common data to be used for the multiple client devices to one or more of the client devices in the high-speed group classified by client classification unit 220. In some embodiments, data transmission unit 230 may further transmit an instruction to the one or more of the client devices classified into the high-speed group to deliver at least some of the common data to one or more of the client devices classified into the low-speed group.

Common data determination unit 240 may be configured to determine the common data to be used for the multiple client devices connected to the server. By way of example, but not limitation, when the multiple client devices connected to the server run a same game application program, the common data may include at least one of background music, a background image, and an advertisement to be commonly used in the game application program. By way of example, but not limitation, common data determination unit 240 may determine which data is to be commonly used for the multiple client devices connected to the server, among the background music, background image, advertisement, etc.

Common data assignment unit 250 may be configured to assign at least some of the common data determined by common data determination unit 240 to the one or more of the client devices classified into the high-speed group. In some embodiments, common data assignment unit 250 may assign at least some of the common data to the one or more of the client devices classified into the high-speed group based at least in part on a capability of the one or more of the client devices classified into the high-speed group to receive data from the server and/or a capability of the one or more of the client devices classified into the high-speed group to deliver data to one or more of the client devices classified into the low-speed group.

As such, since data transmission system 200 may transmit the common data only to some of the multiple client devices connected to the server (e.g., the one or more of the client devices classified into the high-speed group), and instruct the some of the multiple client devices (e.g., the one or more of the client devices classified into the high-speed group) to deliver at least some of the common data to the others of the multiple client devices (e.g., the one or more of the client devices classified into the low-speed group), the overall amount of data traffic from server to the client devices may be reduced, and thus the overall load of the server and/or the overall network load between the server and the client devices may be reduced.

Figure 3:
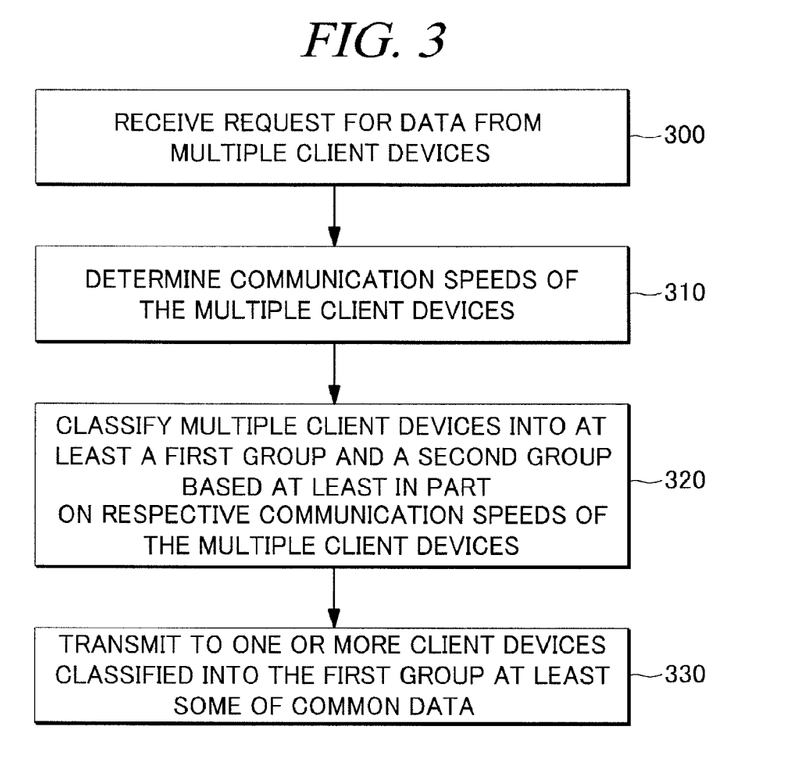
FIG. 3 shows an example flow diagram of a process for providing a data transmission scheme for a cloud-based system, arranged in accordance with at least some embodiments described herein.

FIG. 3 shows an example flow diagram of a process for providing a data transmission scheme for a cloud-based system, arranged in accordance with at least some embodiments described herein.

The method in FIG. 3 may be implemented in a server such as server 100 and/or a data transmission system such as data transmission system 200 including communication speed determination unit 210, client classification unit 220, data transmission unit 230, common data determination unit 240 and common data assignment unit 250 described above. An example process may include one or more operations, actions, or functions as illustrated by one or more blocks 300, 310, 320 and/or 330. Although illustrated as discrete blocks, various blocks may be divided into additional blocks, combined into fewer blocks, or eliminated, depending on the desired implementation. Processing may begin at block 300.

At block 300, the server or the data transmission system may receive a request for data from multiple client devices that are connected to the server and are running a same application program. Processing may continue from block 300 to block 310.

At block 310, the server or the data transmission system may determine communication speed of each of the multiple client devices connected to the server. In some embodiments, the server or the data transmission system may measure the actual communication speed between the server and the respective client devices. In some embodiments, the server or the data transmission system may estimate the respective communication speeds based at least in part on the type of network between the server and the client device. Processing may continue from block 310 to block 320.

At block 320, the server or the data transmission system may classify the multiple client devices into at least a first group and a second group based at least in part on respective communication speeds of the multiple client devices. In some embodiments, the classification of the multiple client devices may be based on communication speed, relative to server 100. Thus, the server or the data transmission system may classify one or more client devices with higher communication speeds, relative to server 100, as the first group and classify one or more client devices with lower communication speeds, relative to server 100, as the second group. By way of example, but not limitation, the server or the data transmission system may classify one or more client devices with communication speeds higher than or equal to a predetermined threshold as the first group, and classify one or more client devices with communication speeds lower than the predetermined threshold as the second group. Alternatively, the server or the data transmission system may classify one or more client devices using a 4th generation (4G) mobile telecommunications network as the first group, and classify one or more client devices using a 3rd generation (3G) mobile telecommunications network as the second group. Processing may continue from block 320 to block 330.

At block 330, the server or the data transmission system may transmit to the one or more client devices classified into the first group at least some of common data to be used in common for the same application program run by the multiple client devices. By way of example, but not limitation, when the multiple client devices connected to the server run a same game application program, the common data may include at least one of background music, a background image, and an advertisement to be commonly used in the game application program. In some embodiments, the server or the data transmission system may instruct the one or more client devices classified into the first group to deliver at least some of the common data to at least some of the one or more client devices classified into the second group, for example, via an ad-hoc network.

As such, the data transmission system may transmit the common data only to some of the multiple client devices connected to the server (e.g., the one or more client devices classified into the first group), and the some of the multiple client devices (e.g., the one or more client devices classified into the first group) may transmit the common data to the others of the multiple client devices (e.g., the one or more client devices classified into the second group). In such cases, the overall amount of data traffic from server to the client devices may be reduced, and thus the overall load of the server and/or the overall network load between the server and the client devices may be reduced.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
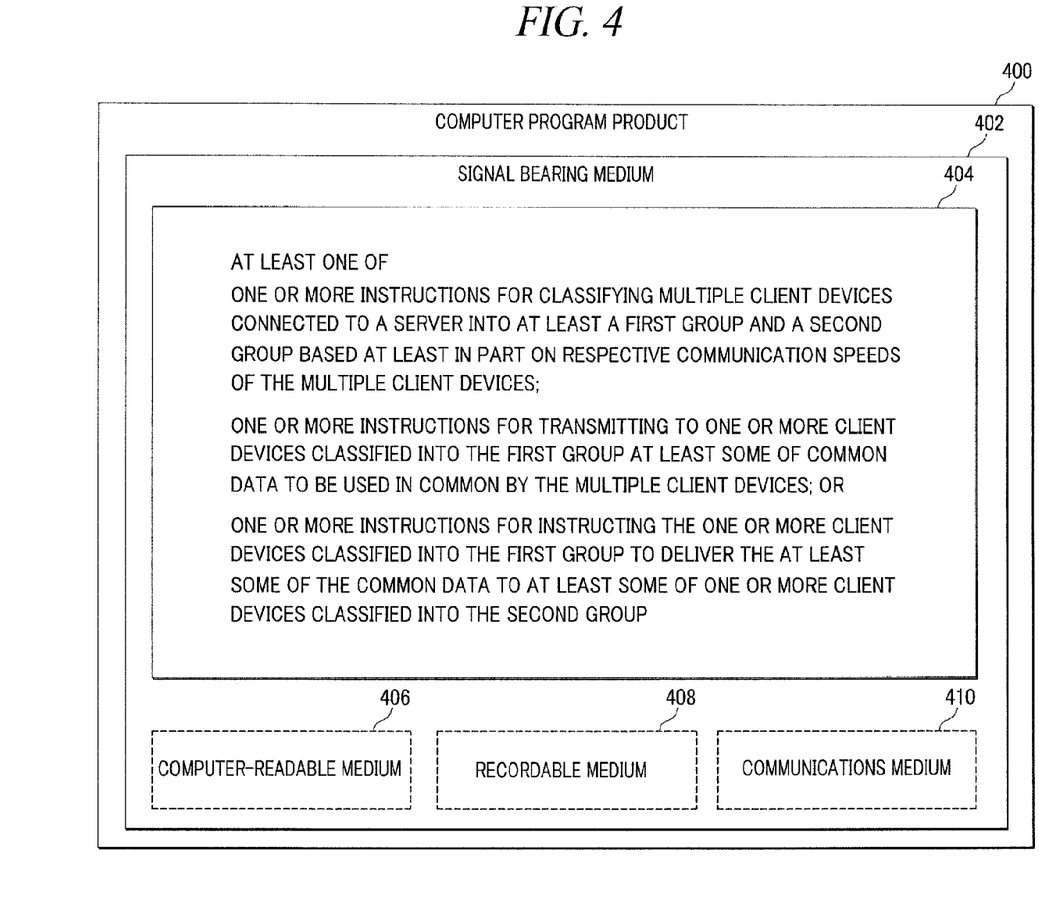
FIG. 4 illustrates computer program products that may be utilized to provide a data transmission scheme for a cloud-based system, arranged in accordance with at least some embodiments described herein.

FIG. 4 illustrates computer program products that may be utilized to provide a data transmission scheme for a cloud-based system, arranged in accordance with at least some embodiments described herein.

Program product 400 may include a signal bearing medium 402. Signal bearing medium 402 may include one or more instructions 404 that, when executed by, for example, a processor, may provide the functionality described above with respect to FIGS. 1-3. By way of example, instructions 404 may include: one or more instructions for classifying multiple client devices connected to a server into at least a first group and a second group based at least in part on respective communication speeds of the multiple client devices; one or more instructions for transmitting to one or more client devices classified into the first group at least some of common data to be used in common by the multiple client devices; or one or more instructions for instructing the one or more client devices classified into the first group to deliver the at least some of the common data to at least some of one or more client devices classified into the second group. Thus, for example, referring to FIG. 2, data transmission system 200 may undertake one or more of the blocks shown in FIG. 3 in response to instructions 404.

In some implementations, signal bearing medium 402 may encompass a computer-readable medium 406, such as, but not limited to, a hard disk drive, a CD, a DVD, a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, program product 400 may be conveyed to one or more modules of data transmission system 200 by an RF signal bearing medium 402, where the signal bearing medium 402 is conveyed by a wireless communications medium 410 (e.g., a wireless communications medium conforming with the IEEE 802.11 standard).

Figure 5:
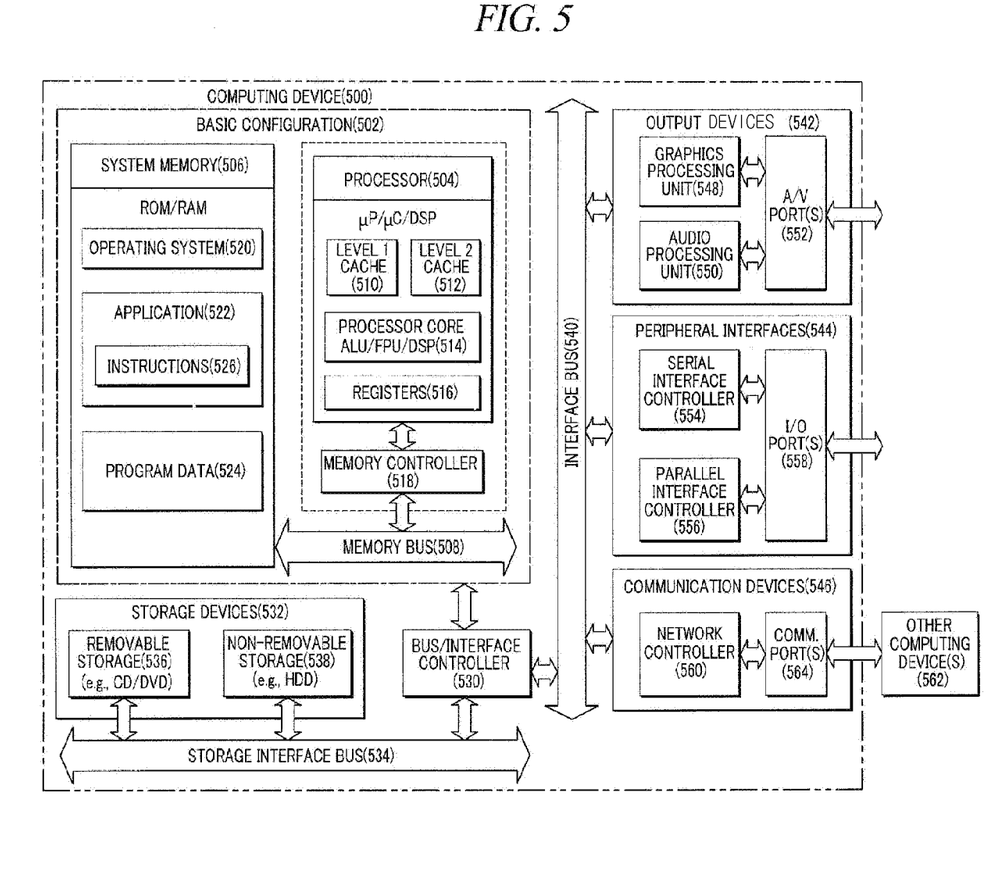
FIG. 5 is a block diagram illustrating an example computing device that may be utilized to provide a data transmission scheme for a cloud-based system, arranged in accordance with at least some embodiments described herein.

FIG. 5 is a block diagram illustrating an example computing device that may be utilized to provide a data transmission scheme for a cloud-based system, arranged in accordance with at least some embodiments described herein.

In these examples, elements of computing device 500 may be arranged or configured for a cloud-based system. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include instructions 526 that may be arranged to perform the functions as described herein including the actions described with respect to the data transmission system 200 architecture as shown in FIG. 2 or including the actions described with respect to the flow charts shown in FIG. 3. In some examples, application 522 may be arranged to operate with program data 524 on an operating system 520 such that implementations for instructions for a data transmission system as described herein.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed by a first client device, the method comprising:

accessing a game application program hosted on a server;

receiving one or more portions of common data, wherein the common data is to be used by the first client device and at least one other client device, wherein the first client device and the at least one other client device are respectively classified into at least a first group and a second group based, at least in part, on respective communication speeds, wherein the common data is divided and assigned to each of one or more client devices classified into the first group including the first client device, wherein the one or more portions of common data are assigned to the first client device, and wherein the common data includes at least one of background music, a background image, and an advertisement to be commonly used in the game application program;

receiving an instruction to transmit the one or more portions of the common data to the at least one other client device that is classified into the second group, wherein the instruction is based on at least a capability of the first client device to receive the one or more portions of the common data and to transmit the one or more portions of the common data; and transmitting, per the instruction, the one or more portions of the common data to the at least one other client device that is classified into the second group, wherein the first client device, which transmits the one or more portions of the common data, has a communication speed higher than a communication speed of the at least one other client device.

2. The method of claim 1, wherein the first group includes a high-speed group and the second group includes a low-speed group.

3. The method of claim 1, wherein the transmitting the one or more portions of the common data to the at least one other client device that is classified into the second group includes transmitting via a Wi-Fi network, a Bluetooth network, or an ultra-wideband (UWB) network.

4. The method of claim 1, further comprising:
sharing the one or more portions of the common data with a second client device classified into the first group.

5. A method performed by a data transmission system that comprises a memory, a storage, and at least one processor coupled to the memory and the storage, the method comprising:
determining communication speeds of a plurality of client devices that are each communicatively coupled to a server to access a game application program provided by the server;
classifying the plurality of client devices into at least a first group and a second group based, at least in part, on the determined communication speeds;
receiving common data to be used by one or more client devices classified into the first group and one or more other client devices classified into the second group, wherein the common data includes at least one of background music, a background image, and an advertisement to be commonly used in the game application program;
dividing the common data and assigning the divided common data to each of the one or more client devices classified into the first group;
transmitting, to each of the one or more client devices classified into the first group, an instruction to transmit the assigned divided common data to the one or more other client devices classified into the second group, wherein the instruction is based on at least a capability of the one or more client devices classified into the first group to receive the assigned divided common data and to deliver the assigned divided common data; and
transmitting the assigned divided common data to at least one client device of the one or more client devices classified into the first group, so as to enable the at least one client device of the one or more client devices classified into the first group to deliver the assigned divided common data to at least one other client device of the one or more other client devices classified into the second group, wherein the at least one client device of the one or more client devices classified into the first group has a communication speed higher than a communication speed of the at least one other client device of the one or more other client devices.

6. The method of claim 5, wherein the classifying comprises classifying the plurality of client devices into at least a high-speed group and a low-speed group.

7. The method of claim 5, wherein the determining comprises measuring communication speeds of the server and respective ones of the plurality of client devices.

8. The method of claim 5, wherein the determining comprises estimating the communication speeds of respective ones of the plurality of client devices based at least in part on respective types of networks between the server and the plurality of client devices.

9. A method performed by a server, the method comprising:
receiving data indicative of a communication speed of respective ones of a plurality of client devices that are communicatively coupled to the server to access a game application program provided by the server;
classifying the plurality of client devices into at least a first group and a second group based, at least in part, on the received data;
determining common data to be used by one or more client devices classified into the first group and one or more other client devices classified into the second group, wherein the common data includes at least one of background music, a background image, and an advertisement to be commonly used in the game application program;
dividing the common data and assigning the divided common data to each of the one or more client devices classified into the first group;
transmitting, to each of the one or more client devices classified into the first group, an instruction to transmit the assigned divided common data to the one or more other client devices classified into the second group, wherein the instruction is based on at least a capability of the one or more client devices classified into the first group to receive the assigned divided common data and to deliver the assigned divided common data; and
transmitting the assigned divided common data to at least one client device of the one or more client devices classified into the first group, wherein the at least one client device classified into the first group is configured to deliver the assigned divided common data to at least one other client device of the one or more other client devices classified into the second group, wherein the at least one client device classified into the first group has a communication speed higher than a communication speed of the at least one other client device of the one or more other client devices.

10. The method of claim 9, wherein the classifying comprises classifying the plurality of client devices into at least a high-speed group and a low-speed group.

11. The method of claim 9, wherein the at least one client device of the one or more client devices classified into the first group is configured to deliver the assigned divided common data via a Wi-Fi network, a Bluetooth network, or an ultra-wideband (UWB) network.

12. The method of claim 9, wherein the game application program provided by the server includes game data that includes one or more of video data and sound data.

13. The method of claim 9, wherein the receiving the data includes receiving data that indicates at least a data reception capability of the respective ones of the plurality of client devices.

14. The method of claim 13, wherein the data reception capability indicates at least one of download speed and available bandwidth of a network over which the server provides the game application program to the respective ones of the plurality of the client devices.

15. The method of claim 9, wherein the receiving the data includes receiving data that indicates at least a data delivery capability of the respective ones of the plurality of client devices.

16. The method of claim 15, wherein the data delivery capability indicates at least a communication speed of an ad-hoc network between the respective ones of the plurality of client devices.

17. The method of claim 9, further comprising:
determining that the at least one client device of the one or more client devices classified into the first group is located close enough to the at least one other client device of the one more other client devices classified into the second group to communicate via an ad-hoc network.

18. A system, comprising:
a server configured to:

receive data indicative of a communication speed of respective ones of a plurality of client devices, classify the plurality of client devices into at least a first group and a second group based, at least in part, on the received data, determine common data to be used by one or more client devices classified into the first group and one or more other client devices classified into the second group, wherein the common data includes at least one of background music, a background image, and an advertisement to be commonly used in the game application program, divide the common data and assign the divided common data to each of the one or more client devices classified into the first group, transmit, to each of the one or more client devices classified into the first group, an instruction to transmit the assigned divided common data to one or more other client devices classified into the second group, wherein the instruction is based on at least a capability of the one or more client devices classified into the first group to receive the assigned divided common data and to deliver the assigned divided common data, and transmit the assigned divided common data to a first client device of the one or more client devices classified into the first group; and the first client device configured to:
access a game application program hosted on the server, receive the assigned divided common data, and transmit the assigned divided common data to the at least one other client device of the one or more other client devices that are classified into the second group, wherein the first client device, which transmits the one or more portions of the common data, has a communication speed higher than a communication speed of the at least one other client device.

19. The system of claim 18, wherein the server is configured to classify the plurality of client devices into at least a high-speed group and a low-speed group.

* * * * *

UNITED STATES PATENT AND TRADEMARK OFFICE
CERTIFICATE OF CORRECTION

PATENT NO. : 9,906,587 B2
APPLICATION NO. : 14/708724
DATED : February 27, 2018
INVENTOR(S) : Kim It is certified that error appears in the above-identified patent and that said Letters Patent is hereby corrected as shown below:

In Column 13, Lines 56-57, in Claim 8, delete "based at least in part" and insert -- based, at least in part, --, therefor.

Signed and Sealed this
Twenty-ninth Day of May, 2018

Andrei Iancu
*Director of the United States Patent and Trademark Office*